United States Patent [19]

Osawa

[11] Patent Number: 4,929,095
[45] Date of Patent: May 29, 1990

[54] BALL RETAINER OF A LINEAR GUIDE APPARATUS

[75] Inventor: Nobuyuki Osawa, Takasaki, Japan

[73] Assignee: Nippon Seiko Kabushiki Kaisha, Tokyo, Japan

[21] Appl. No.: 357,482

[22] Filed: May 26, 1989

[30] Foreign Application Priority Data

May 31, 1988 [JP] Japan .............................. 63-72338[U]

[51] Int. Cl.⁵ .............................................. F16C 29/06
[52] U.S. Cl. ..................................................... 384/45
[58] Field of Search ............................. 384/45, 43, 44; 464/168

[56] References Cited

U.S. PATENT DOCUMENTS 4,253,709 3/1981 Teramachi .
4,630,872 12/1986 Teramachi ............................ 384/45
4,674,893 6/1987 Teramachi ............................ 384/45
4,784,498 11/1988 Geka et al. ............................ 384/45

Primary Examiner—Lenard A. Footland
Attorney, Agent, or Firm—Basile and Hanlon

[57] ABSTRACT

A ball retainer for holding the balls in the upper ball rolling groove of the slider is made of a synthetic resin material and has a rectangular flat frame shape. The ball retainer has supporting portions protruding axially from opposite ends and side frames which can be deflected inwardly by an elastic deformation when an external force is applied thereto. A ball holding groove of an arcuate cross section is formed in an outer said surface of each of the side frames. The side frames have hook portions at longitudinally intermediate positions protruding inwardly to oppose each other. The hook portions are normally spaced from each other with a predetermined interval, and when the side frames are deflected by the external force inwardly, the hook portions engage each other to maintain the side frame in the deflected state so that the balls can be mounted into the ball rolling grooves of the slider. After the balls are mounted, the engagement of the hook portions is released to allow the ball retainer to return to its original shape. The ball retainer is supported at the supporting portions by the end caps which are respectively attached to the opposite ends of the slider main body so that the ball retainer is accommodated in a space between the upper surface of the guide rail and the inner surface of the slider main body.

2 Claims, 4 Drawing Sheets

BALL RETAINER OF A LINEAR GUIDE APPARATUS

BACKGROUND OF THE INVENTION

1. Field of the Invention

The present invention relates to a ball retainer of a linear guide apparatus which includes a guide rail and a slider movable on the guide rail through rolling of balls interposed therebetween.

2. Description of the Prior Art

A prior art ball retainer of a linear guide apparatus of this type is disclosed, for example, in U.S. Pat. No. 4,253,709 (Japanese Patent Laid-Open Publication No. 55-72912).

As shown in FIGS. 9 and 10, the ball retainer 3 of a linear guide apparatus including a guide rail 1 and a slider 2 movably mounted on the guide rail 1 through rolling balls B is made of a thin steel plate. The ball retainer 3 is formed by stamping so that both sides have a wave form along the inner surface of the slider 2. In each of the sides of the wave form, a window 5 is formed having a width somewhat smaller than a diameter of the ball B and extending axially along the length of the ball retainer 3.

The retainer 3 is secured to the inner surface of the slider 2 by fixing screws 4, and the balls B mounted in the window 5 are held in ball rolling grooves 6 and 7 of the inner surface of the slider 2.

When the slider is linearly moved on the guide rail 1, many balls B roll in the ball rolling grooves 6 and 7 and in the ball rolling grooves 8 and 9 of both side surfaces of the guide rail 1.

However, in such a prior art linear guide apparatus, the ball retainer 3 is made of a thin steel plate, and the balls B are held in the ball rolling grooves 6 and 7 by ball holding stocks of the windows 5 formed in the sides of the ball retainer 3. As a result, the following problems are encountered.

It is necessary to remove one of the end caps at opposite ends of the slider 2 at the time of mounting the balls B in the ball rolling grooves 6 and 7 of the slider.

Furthermore, when the balls B are replaced to adjust a preload or the like, it is necessary to remove the end cap in the same manner, or the ball retainer 3 itself must be removed.

Accordingly, the work for mounting or demounting of the balls B to and from the ball rolling grooves 6 and 7 in the inside of the slider is inconvenient and troublesome, and further, it is impossible to automatically assemble.

SUMMARY OF THE INVENTION

It is an object of the present invention to provide a ball retainer of a linear guide apparatus which enables easy mounting and demounting of the balls, and which, also, enables automatic assembling of the balls.

A ball retainer according to the invention is used with a linear guide apparatus which includes an axially extending guide rail having ball rolling grooves formed in both edges between an upper surface and both side surfaces of the guide rail, a slider mounted on the guide rail movably and having ball rolling grooves formed in an inner surface at positions corresponding to the ball rolling grooves of the guide rail, and a plurality of balls mounted in the opposing ball rolling grooves of the guide rail and the slider. The ball retainer has a rectangular flat frame shape and has axially protruding supporting portions at opposite ends. Both side frames have a thickness and a width allowing the ball retainer to deflect inwardly by being elastically deformed by an external force applied thereto. A ball holding groove having an arcuate cross section is formed in an outer side surface of each of the side frames to hold the balls. Both of the side frames have hook portions respectively provided at intermediate positions of the overall length of the side frames which protrude inwardly so that the hook portions normally oppose to each other with a predetermined interval therebetween. The hook portions engage each other when both side frames are deflected inwardly in a curved shape and the deflected state can be held by the hook portions. The hook portions can also be disengaged. The ball retainer is supported at the supporting portions by end caps which are respectively attached to opposite ends of the slider. The ball retainer is made of a synthetic resin material.

The ball retainer can be simply mounted to the inner surface of the slider by merely inserting the protruded supporting portions into recesses formed in the joining surfaces of the end caps at the time of attaching the end caps to the slider.

Then, the side frames of the ball retainer are deflected inwardly in a curved shape by using a jig or the like so as to engage the hook portions with each other. As a result, an opening width between the ball rolling groove of the slider and the ball holding groove of the ball retainer is expanded to a sufficient size to allow the balls to be mounted or demounted, and this expanded condition is maintained. Thus, by virtue of the expanded opening, the mounting and demounting of the balls to and from the ball rolling groove of the slider can be very easily implemented. After a predetermined number of balls have been mounted, the engagement of the hook portions is released, and the ball retainer returns to its original shape by the elasticity thereof to hold the balls in the ball rolling grooves of the slider.

BRIEF DESCRIPTION OF THE DRAWINGS

The drawings show embodiments of the invention, in which:

FIGS. 8A and 8B are enlarged sectional views taken along line 8—8 in FIG. 7, useful to explain the operation of the hook portions, in which FIG. 8A shows a state of the hook portions in the course of engagement, and FIG. 8B shows a finished stated of engagement of the hook portions;

DESCRIPTION OF THE PREFERRED EMBODIMENTS

Figure 1:
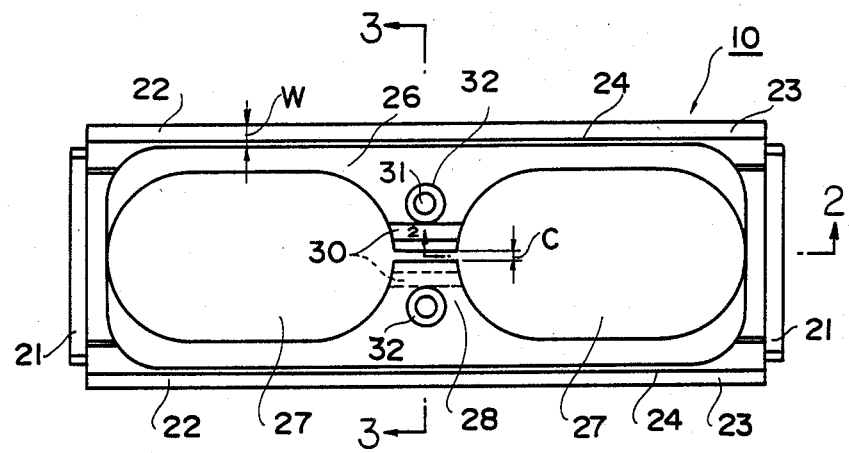
FIG. 1 is a bottom view of one embodiment of a ball retainer.
Figure 2:
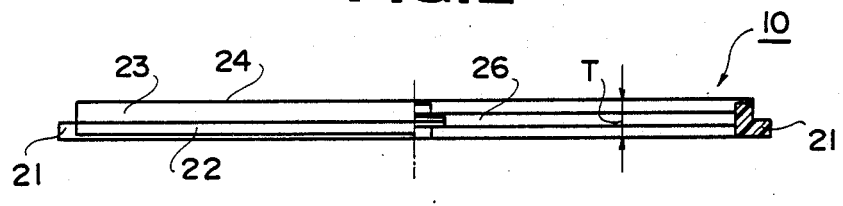
FIG. 2 is a side view of the ball retainer with a right half part in cross section taken along line 2—2 in FIG. 1.
Figure 3:
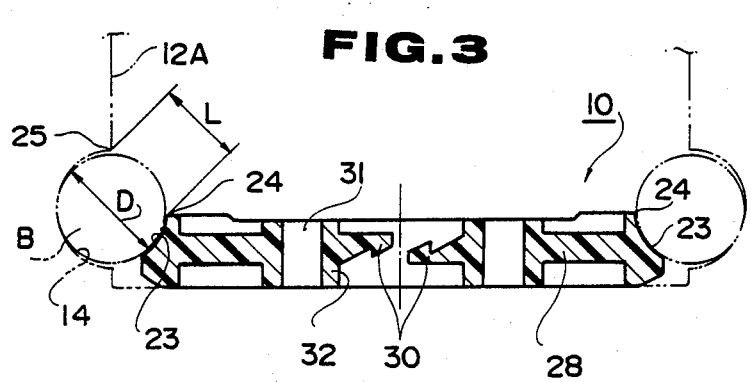
FIG. 3 is a sectional view taken along line 3—3 in FIG. 1.
Figure 4:
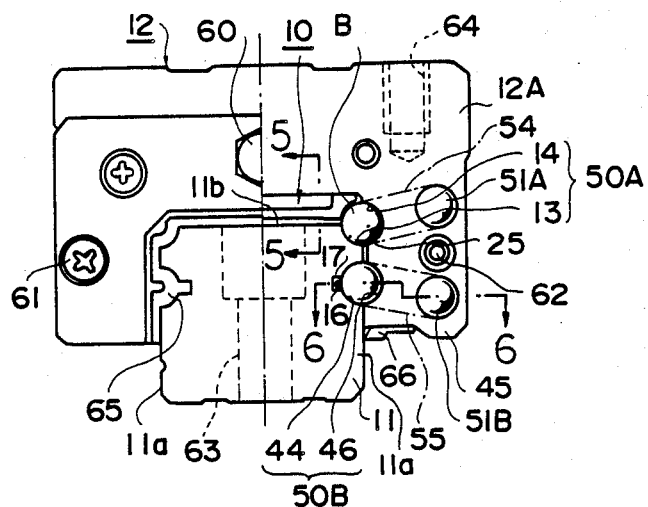
FIG. 4 is a front view with a right half part cut away.
Figure 5:
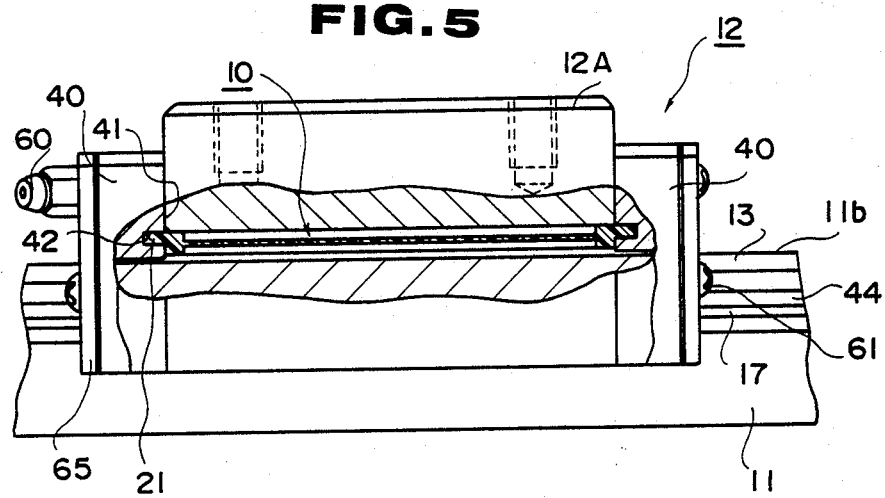
FIG. 5 is a side view with a part of FIG. 4 in cross section taken along line 5—5 in FIG. 4.

A ball retainer 10 shown in FIGS. 1 to 3 is attached to an inner surface of a slider 12 which has an inverted U-shaped cross section and is movably mounted on a guide rail 11 for relative movement in an axial direction as shown in FIGS. 4 and 5.

Specifically, an upper ball rolling groove 13 having a substantially quarter circular cross section and extending axially is formed in each of the edges between an upper surface 11b and side surfaces 11a and 11a of the guide rail 11. On the other hand, ball rolling grooves 14 having a substantially half circular cross section are formed in the inner surface of the slider 12 so that the ball rolling grooves 14 respectively oppose to the ball rolling grooves 13 of the guide rail 11. The slider 12 travels on the guide rail 11 through the rolling of the balls B which roll in the upper ball rolling grooves 13 and 14 of the guide rail 11 and the slider 12. The balls B are mounted in the upper ball rolling groove 14 before the slider 12 is assembled to the guide rail 11. It is necessary to hold the mounted balls B so that they do not fall off the upper ball rolling groove 14. This function is performed by the ball retainer 10.

The ball retainer 10 has a substantially rectangular flat frame shape, and is an injection molded product of a synthetic resin material. Supporting portions 21 protrude from opposite ends of a rectangular, flat frame main portion of the ball retainer 10. Both side frames 22 have a thick wall extending linearly along the upper ball rolling grooves 14 of the slider 12. A wall thickness T and a width W of each side frame 22 are determined so that the side frame 22 can be deflected inwardly in a curved shape due to an elastic deformation when an external force is applied inwardly to the side frame 22. Each of the side frames 22 has a ball holding groove 23 of a substantially quarter circular cross section extending over the overall length formed in an outer side surface thereof. The ball holding grooves 23 hold the balls B of the pair of right and left ball rolling grooves 14e of the slider 12 respectively.

When the ball retainer 10 is assembled to the slider 12, as shown in FIG. 3 (shown upside down), an opening having a width L slightly smaller than a diameter D of the balls B is normally formed between the lower end edge 24 of the ball holding groove 23 of the ball retainer 10 and a lower edge 25 (phantom line) of the upper ball rolling groove 14 of the slider 12.

The ball retainer 10 has, at an inner side of each side frame 22, a very thin plane portion 26. Two holes 27 of an ellipse shape are formed by cutting out a major part of plane portion of the ball retainer 10. The two holes 27 are arranged in the longitudinal direction. Portions of the plane portion 26 sandwiched by the two holes 27, which are at intermediate positions of the overall length of the side frames 22, protrude inwardly to oppose each other from both the side frames 22 and 22 and form inwardly extending portions 28. Both inwardly extending portions 28 are spaced from each other with an interval C located near the center line of the ball retainer 10.

Hook portions 30 having a hook shape are provided at opposing ends of the inwardly extending portions 28 and are spaced normally facing each other with the interval C. When both side frames 22 and 22 are deflected inwardly in a curved shape, the hook portions 30 engage each other. A pair of bosses 32 having work holes 31, respectively, are formed at base portions of the hook portions 30, and a tool, such as a snap ring for a hole, can be applied to the work holes 31.

In order to fix the ball retainer 10 to the inside of the slider 12, as shown in FIG. 5, each of the end caps 40 which are attached to opposite ends of a slider main body 12A has a recess 42 formed in a joining end surface 41.

The guide rail 11 has lower or under ball rolling grooves 44 which have a half circular cross section and are formed to extend axially in the side surfaces 11a and 11a. An escape channel 17 is formed along the axial direction in a bottom of each ball rolling groove 44 for a wire shaped ball retainer 16 which prevents falling out of the balls B.

On the other hand, in the inner surface of both side walls 45 of the slider main body 12A, there are formed under ball rolling grooves 46 having a half circular cross section so that the under ball rolling grooves 46 respectively oppose the under ball rolling grooves 44 of the guide rail 11.

An upper ball rolling path 50A is formed by the upper ball rolling groove 13 of the guide rail 11 and the upper ball rolling groove 14 of the slider 12. A lower ball rolling path 50B is formed by the lower ball rolling groove 44 of the guide rail 11 and the lower ball rolling groove 46 of the slider 12.

In a thick wall portion of the side wall 45 of the slider main body 12A, there is formed an upper ball return path 51A constituted by a through bore of a circular cross section in parallel with the upper ball rolling path 50A, and a lower ball return path 51B of a similar through bore in parallel with the lower ball rolling path 50B.

The end caps 40 respectively attached to opposite ends of the slider main body 12A are injection mold products of a synthetic resin material, and have an inverted U-shape similar to the slider main body 12A. Each end cap 40 is formed with upper and lower curved paths 54 and 55 of a half doughnut shape in a joining end surface 41 of each side wall. The upper curved path 54 is connected to the upper ball rolling path 50A and the upper ball return path 51A, and the lower curved path 55 is connected to the lower ball rolling both 50B and the lower ball return path 51B.

A ball infinitely circulating route constituted by the upper ball rolling path 50A, the upper ball return path 51A, and the upper curved paths 54, and a ball infinitely circulating route constituted by the lower ball rolling path 50B, the lower ball return path 51B, and the lower curved paths 55 are formed in each lateral side of the guide rail 11 so that many balls B roll in each ball infinitely circulating route with the movement of the slider 12.

Figure 6:
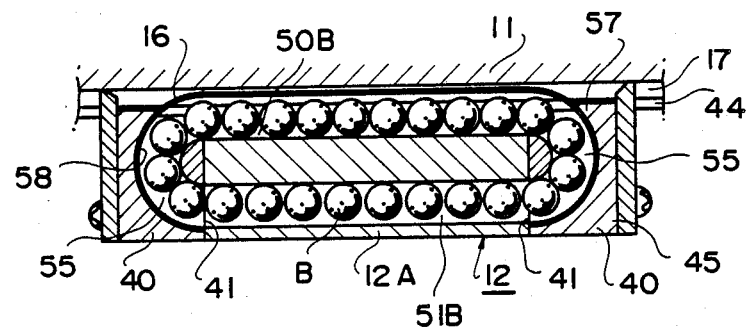
FIG. 6 is a sectional view taken along line 6—6 in FIG. 4.

In each of the curved paths 54 and 55 of the end cap 40, there is formed a ball scooping projection 57, FIG. 6, protruding in a half circular shape at an inner end of a guide surface for guiding the balls B outwardly. A tip having an acute angle with respect to the ball scooping projection 57 is positioned close to the ball rolling groove 13 or 14.

The wire shaped ball retainer 16 holds the balls B in the lower ball rolling groove 46 to prevent the balls B from falling out thereof. The ball retainer 16 is mounted in a wire holding channel 58 formed in a bottom guide surface of the lower curved path 55 of the end cap 40. When the slider 12 is assembled to the guide rail 11, the ball retainer 16 is accommodated in the wire escape channel 17 and, thus, interference with the guide rail 11 can be prevented.

On the other hand, the ball retainer 10 which holds the balls B in the upper ball rolling groove 14 of the slider 12 is supported by the end caps 40 of the slider 12 so that the ball retainer 16 is accommodated in a space between the upper surface 11b of the guide rail 11 and the facing inner surface of the slider main body 12A.

In FIGS. 4 and 5, reference numeral 60 designates an oil feed nipple attached to the end cap 40, and a lubricant injected to the nipple 60 is fed to the upper ball rolling path 50A and the lower ball rolling path 50B through an oil feed groove (not shown) formed in the joining surface 41 of the end cap 40. Reference numeral 61 designates a fixing screw for attaching the end cap 40 to the slider main body 12A and reference numeral 62 designates a screw hole for the screw 61.

Furthermore, reference numeral 63 designates a through hole for a bolt to secure the guide rail 11 to a base or the like (not shown) when the linear guide apparatus is to be used, and reference numeral 64 designates a screw hole for a screw to fix a driven member, such as a table or the like, to the slider 12. Moreover, reference numeral 65 designates a wiper seal made of a synthetic resin material and attached to the end cap 40 for preventing the intrusion of foreign particles by wiping the ball rolling grooves 13 and 14 of the guide rail 11. Reference numeral 66 designates an under seal attached to the bottom of the slider 12.

Next, the operation of the invention will be described.

In attaching the end cap 40 to the slider main body 12A, the supporting portion 21 of the ball retainer 10 is inserted into the recess 42 formed in the joining end surface 41 of the end cap 40. Then, the end cap 40 is attached to the slider main body 12A with the joining end surface 41 in contact with the joining end surface of the slider main body 12 by screwing the screw 61 into the screw hole 62.

The procedure for mounting the balls B to the upper ball rolling groove 14 of the slider 12 to which the ball retainer 10 is assembled is as follows.

Figure 7:
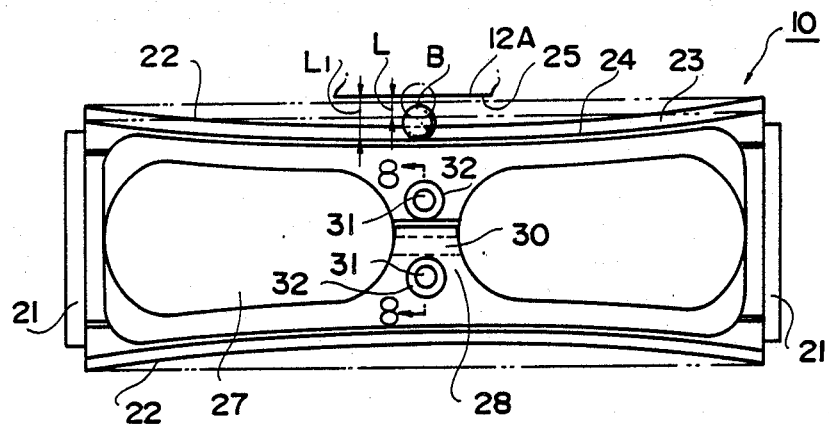
FIG. 7 is a bottom view useful to explain the operation of the ball retainer.
Figure 8A:
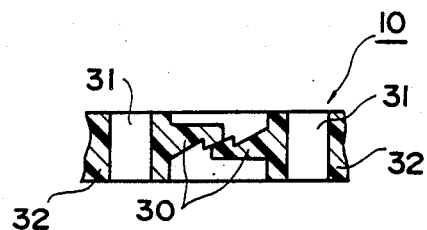
Figure 8B:
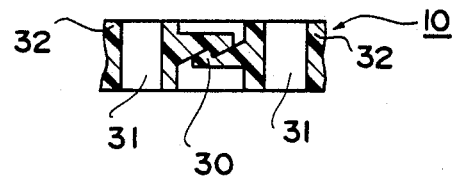
Figure 9:
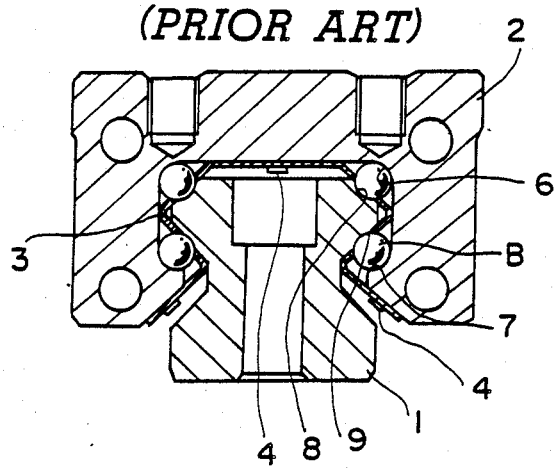
FIG. 9 is a cross sectional view of a prior art ball retainer provided in a linear guide apparatus.
Figure 10:
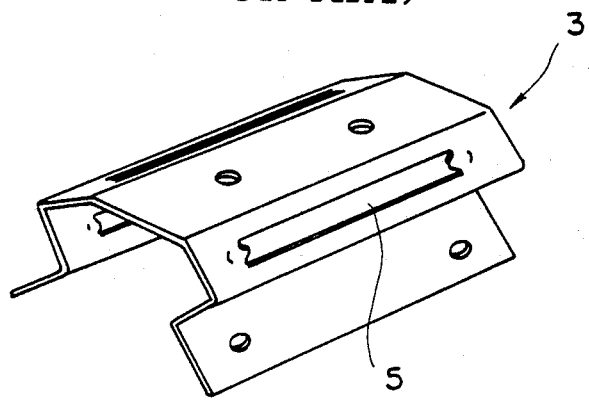
FIG. 10 is a perspective view of the ball retainer shown in FIG. 9.

First, the tips of a tool, such as a snap ring for holes, are inserted into the pair of work holes 31 of the ball retainer 10 to make both the side frames 22 and 22 deflect inwardly in a curved shape. As a result, the hook portions 30 having a hook shape abut against each other as shown in FIG. 8A. When both the side frames 22 and 22 are deflected further inwardly, the hook portions 30 engage each other as shown in FIG. 8B. Consequently, the ball retainer 10 is maintained in an elastically deformed state as shown in FIG. 7, and the interval L of the opening between the lower end edge 24 of the ball holding groove 23 of the ball retainer 10 and the lower edge 25 of the upper ball rolling groove 14 of the slider main body 12A is expanded to an interval L1 at an intermediate position of the overall length of the ball retainer 10 so that the interval L1 is larger than the diameter of the balls B.

This expanded interval is maintained as it is by the hook portions 30.

Then, the balls B are mounted by utilizing the expanded interval L1.

After the balls B of a predetermined number have been mounted, the tips of the tool are inserted into the pair of work holes 31 to deflect both the side frames 22 inwardly to a great extent to separate the hook portions 30 vertically. Thus, the engagement of the hook portions 30 is released. The ball retainer 10 restores its original shape by its elasticity, and the interval of the opening between the lower end edge 24 of the ball holding groove 23 and the lower edge 25 of the upper ball rolling groove 14 of the slider main body 12A returns to the interval L which is smaller than the diameter of the balls B. Thereafter, the balls B are reliably held in the upper ball rolling groove 14.

Furthermore, when the balls B are to be replaced to change a preload during use, the replacement can be performed by deflecting both the side frames 22 inwardly in a curved shape in a similar manner. Accordingly, there is no need to remove the ball retainer and such work is convenient and easy.

After mounting the balls B, the slider 12 is assembled to the guide rail 11.

In this embodiment, since the ball retainer 10 can be mass produced by injection molding of a synthetic resin material, the ball retainer 10 can be provided at low cost.

In the above embodiment, it is described as to the case in which the balls B are mounted into the upper ball rolling groove 14 of the slider main body 12A by deforming and curving the ball retainer 10 by using a hand tool. However, since the ball retainer 10 can be maintained in a deflected state of the ball holding groove 23 by the hook portions 30, it is possible to insert the balls of a constant number from a ball shoot automatically. Thus, the automatic assembling of the slider 12 is easy and the improvement in productivity can be realized to a great extent.

As described in the foregoing, since the ball retainer is arranged as described above, there is no need to remove the end caps or the ball retainer and such work becomes convenient and easy. Furthermore, an advantage is provided in which automatic assembling is easily realized.

What is claimed is:

1. A ball retainer used with a linear guide apparatus, wherein said linear guide apparatus includes an axially extending guide rail and has ball rolling grooves formed in both corner edges between an upper surface and both side surfaces, a slider mounted on said guide rail and movable in an axial direction and having ball rolling grooves formed in an inner surface at positions respectively opposing the ball rolling grooves of said guide rail, and a plurality of balls mounted in mutually opposing ball rolling grooves of said guide rail and said slider, said ball retainer comprising:

a rectangular substantially flat frame-shaped main portion;

supporting portions protruding axially from opposite ends of said main portion;

side frame portions respectively having ball holding grooves of an arcuate cross section formed in outer side surfaces thereof, said ball holding grooves extending axially over an overall length of said frame portions, said side frame portions having a wall thickness and a width which allows said side frame portions to deflect inwardly in a curved shape by elastic deformations by an external force applied thereto; and hook portions respectively protruding inwardly from intermediate positions of the overall length of said side frame portions to normally oppose each other with a predetermined interval therebetween, said hook portions being releasably engageable with each other by deflection of said side frame portions inwardly in a curved shape to hold the deflected state of said side frame portions.

2. A ball retainer according to claim 1, wherein said ball retainer is made of a synthetic resin material and supported between the upper surface of said guide rail and the inner surface of said slider by said supporting portions which are inserted into recesses formed in end caps attached to opposite ends of said slider.

* * * * *